US012039271B2

(12) United States Patent
Jurzak et al.

(10) Patent No.: US 12,039,271 B2
(45) Date of Patent: Jul. 16, 2024

(54) METHOD AND SYSTEM TO ENSURE A SUBMITTER OF AN ANONYMOUS TIP REMAINS ANONYMOUS

(71) Applicant: MOTOROLA SOLUTIONS, INC., Chicago, IL (US)

(72) Inventors: Pawel Jurzak, Cracow (PL); Grzegorz Kaplita, Rzeszow (PL); Wojciech Kucharski, Jaworzno (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 274 days.

(21) Appl. No.: 17/272,432

(22) PCT Filed: Dec. 6, 2018

(86) PCT No.: PCT/PL2018/050063
§ 371 (c)(1),
(2) Date: Mar. 1, 2021

(87) PCT Pub. No.: WO2020/117074
PCT Pub. Date: Jun. 11, 2020

(65) Prior Publication Data
US 2022/0350969 A1    Nov. 3, 2022

(51) Int. Cl.
*G06F 40/284*    (2020.01)
*G06F 16/242*    (2019.01)
(52) U.S. Cl.
CPC .......... *G06F 40/284* (2020.01); *G06F 16/243* (2019.01)

(58) Field of Classification Search
CPC .............................. G06F 40/284; G06F 16/243
See application file for complete search history.

(56) References Cited

U.S. PATENT DOCUMENTS 6,807,569 B1    10/2004  Bhimani et al.
7,234,059 B1    6/2007   Beaver et al.
(Continued)

FOREIGN PATENT DOCUMENTS

WO    2017003494 A1    1/2017

OTHER PUBLICATIONS

Ku et al., A A Crime Reports Analysis System to Identify Related Crimes, 2011, Journal of the American Society for Information Science and Technology, 62(8):1533-1547 (Year: 2011).*

(Continued)

*Primary Examiner* — Sonia L Gay (57) ABSTRACT

In one aspect, a method to ensure a submitter of an anonymous tip remains anonymous is provided. An anonymous tip may be received from a tip submitter at an electronic tip submission system. Natural language processing may be applied to extract at least one token from the anonymous tip. At least one query may be created based on the extracted at least one token. The at least one query may be executed against one or more databases storing data associated with the at least one token. A number of possible tip submitters may be determined based on the results of the at least one query. Anonymization techniques may be applied to the anonymous tip when the number of possible tip submitters is less than or equal to a defined threshold. The anonymous tip may be submitted when the number of possible tip submitters exceeds the defined threshold.

17 Claims, 3 Drawing Sheets

(56) References Cited

U.S. PATENT DOCUMENTS

| | | | |
|---|---|---|---|
| 7,379,879 B1* | 5/2008 | Sloo | G06Q 50/265 |
| | | | 705/325 |
| 7,472,093 B2 | 12/2008 | Juels | |
| 10,140,321 B2 | 11/2018 | Hakkani-Tur et al. | |
| 10,321,278 B2 | 6/2019 | Proctor | |
| 11,068,845 B2* | 7/2021 | Spaulding | G06Q 10/10 |
| 2008/0154819 A1 | 6/2008 | Boies et al. | |
| 2010/0169332 A1 | 7/2010 | Bezzi | |
| 2010/0268719 A1 | 10/2010 | Cormode et al. | |
| 2012/0060062 A1* | 3/2012 | Lin | G06Q 10/00 |
| | | | 714/48 |
| 2013/0066818 A1 | 3/2013 | Assadollahi et al. | |
| 2015/0244681 A1 | 8/2015 | Blumenfeld et al. | |
| 2015/0304300 A1 | 10/2015 | Bender et al. | |
| 2017/0359313 A1 | 12/2017 | Livneh et al. | |
| 2021/0004485 A1 | 1/2021 | Summers et al. | |
| 2021/0303791 A1* | 9/2021 | Pletea | G06F 40/284 |

OTHER PUBLICATIONS

S. Lohiya and L. Ragha, "Privacy Preserving in Data Mining Using Hybrid Approach," 2012 Fourth International Conference on Computational Intelligence and Communication Networks, Mathura, India, 2012, pp. 743-746, doi: 10.1109/CICN.2012.166.

C. Chatzigeorgiou, L. Toumanidis, D. Kogias, C. Patrikakis and E. Jacksch, "A communication gateway architecture for ensuring privacy and confidentiality in incident reporting," 2017 IEEE 15th International Conference on Software Engineering Research, Management and Applications (SERA), London, 2017, pp. 407-411, doi: 10.1109/SERA.2017.7965759.

The International Search Report and the Written Opinion corresponding patent application No. PCT/PL2018/050063 filed Dec. 6, 2018, all pages.

* cited by examiner

METHOD AND SYSTEM TO ENSURE A SUBMITTER OF AN ANONYMOUS TIP REMAINS ANONYMOUS

BACKGROUND

One valuable source of information for law enforcement personnel is tips submitted by the public. Any person who witness a crime (or potential crime) is able to call an emergency number, such as 911 to report the information to public safety officials. In cases where there may not be a need for urgent reporting, a non-emergency number may be provided. To aid in convenient reporting of tips, some agencies may even provide a mechanism for tips to be provided via electronic devices. For example, an agency may set up a website where a person providing a tip may go to enter the tip. As another example, some agencies may allow tips to be submitted via e-mail.

In some cases, a person submitting an electronic tip may desire to remain anonymous. For example, an individual may be reporting the commission of a crime. The tipster may be in fear for their own personal safety in the event that the perpetrator of the crime should become aware of the tipster's identity. In other cases, the tipster may simply want to no further involvement with the incident, other than providing the anonymous tip. For example, the tipster may not wish to be interviewed in person by public safety officers or participate in court proceedings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Electronic tip submission systems can be designed to help preserve the anonymity of tip submitters. For example, the tip submission system user interface may not ask for any identifying information (e.g. name, address, phone number) of the tip submitter. Some tip submission systems may go to great lengths to protect the tip submitter's identity. For example, in the United States, some electronic tip submission systems may locate their computing systems in foreign countries that do not agree to provide any information (e.g. internet protocol addresses) related to tip submitters to any government agency. By doing so, identification information of tip submitters may even be protected from government subpoenas. The tip submission system itself may not store any identification information (e.g. IP address of tip submitter, device used by tip submitter, etc.).

Although electronic tip submission systems can be designed so as to not solicit identifying information and to protect identifying information, a problem arises in that the tip submitter himself may submit information that may be used to self-identify the tip submitter. For example, the tip submitter may submit the tip the following. "My name is John Smith. I live at 10 Main Street. I think my neighbor, who lives across the street at 11 Main Street, has just stolen an expensive red sports car. I looked out my front window and saw him drive it into his garage and suspiciously close the door."

As should be clear, the tip submitter's name (e.g. John Smith) and address (e.g. 10 Main Street) are clearly pieces of information that can be used to identify the tip submitter. However, other information in the tip could be problematic as well. For example, the tip says that the potential criminal is the tip submitters neighbor. In a dense, urban environment, a reference to a neighbor may not really be identifying as any given person may have many neighbors. However, in sparsely populated rural areas, people may only have one or two neighbors, and as such, identifying someone as you neighbor limits the number of people who could possibly have submitted the tip.

In addition, identification of the neighbor's address, and the statement that the neighbor lives across the street limits the number of possible tip submitters. Furthermore, the tip submitter stated that he saw the potential criminal driving the car into the garage when looking out his front window. Depending on the layout of residences in the area, the number of addresses that have a view of the suspected criminals garage from their own front window may be limited.

The techniques described herein solve this problem and others. An anonymous electronic tip may be received from a tip submitter. The tip may be processed using natural language processing techniques to extract tokens from the submitted tip. For instance, in the example tip submitted above, tokens such as "John Smith," "Neighbor," and "11 Main Street" may be extracted. These tokens may then be used to create queries.

For example, one query may be, "how many people named John Smith live in the vicinity of 11 Main Street?" Another example query may be, "how many neighbors exist for address 11 Main Street?" These queries may then be executed against relevant databases. The number of results returned can be used to determine if the tip is sufficiently anonymous. For example, assume the first query indicates that four people named "John Smith" live in the vicinity of "11 Main Street." Further assume that the result of the second query indicates that there are only five houses neighboring "11 Main Street." The combination of these two pieces of information would severely limit the number of possible tip submitters to the five neighbors of the suspects address, and then further limit to only people named "John Smith" at one of those five neighbors.

The techniques described herein examine the number of results received from the queries. If an insufficient number of results is received, the tip is modified. For example, proper names (e.g. "John Smith") may be replaced with generic nouns (e.g. "tipster"). Relationship information (e.g. "neighbor," "across the street") may be removed or replaced with generic identifiers. Address that can be linked to the tip submitter may be removed (e.g. "I live at 10 Main Street"). For example, the revised tip may be, "My name is tipster. I live at blank. I think someone, who lives at 11 Main Street, has just stolen an expensive red sports car. I looked out my front window and saw him drive it into his garage and suspiciously close the door."

The system described herein may then repeat the previously described steps. The revised tip may again be processed to extract tokens, queries created based on those tokens, the queries are executed, and the total number of results may be examined to determine if the tip is sufficiently anonymous. If the tip is not sufficiently anonymous, the process continues to repeat until it is. For example, in the modified tip, there is still a statement that the suspects garage can be seen from the front window. A query could be generated asking, "how many addresses can view the garage of 11 Main Street from their front window?" If such a query returns a small number of results, which means the tip is not sufficiently anonymized, the process may repeat. For example, the token "my front window" could be removed (e.g. "I looked and saw him drive . . . "). In some implementations, once the process is complete, the tipster may be asked to review the final modified tip to ensure that it still conveys the details that are needed to make the tip useful to public safety officials.

In one aspect, a method to ensure a submitter of an anonymous tip remains anonymous is provided. An anonymous tip from a tip submitter may be received at an electronic tip submission system. Natural language processing may be applied to parse the anonymous tip and extract at least one token from the anonymous tip. At least one query based on the extracted at least one token may be created. The at least one query may be executed against one or more databases storing data associated with the at least one token. A number of possible tip submitters may be determined based on the results of the at least one query. Anonymization may be applied to the anonymous tip when the number of possible tip submitters is less than or equal to a defined threshold. The anonymous tip may be submitted when the number of possible tip submitters exceeds the defined threshold.

In one aspect, the previous steps may be repeated until the number of possible tip submitters exceeds the defined threshold. In one aspect, applying anonymization to the anonymous tip further comprises modifying at least one of the extracted tokens. In one aspect, applying anonymization to the anonymous tip further comprises removing at least one of the extracted tokens. In one aspect, prohibited tokens may be removed after applying natural language processing.

In one aspect, the anonymous tip may be presented to the tip submitter prior to submitting the tip. In one aspect, an input may be received from the tip submitter indicating information in the tip to be submitted is accurate. In one aspect, the created at least one query is based on a query result of a previous query. In one aspect, systems to implement the described method are provided. In one aspect, a non-transitory processor readable medium containing instructions thereon that when executed by a processor cause the process to implement the described method are provided.

Figure 1:
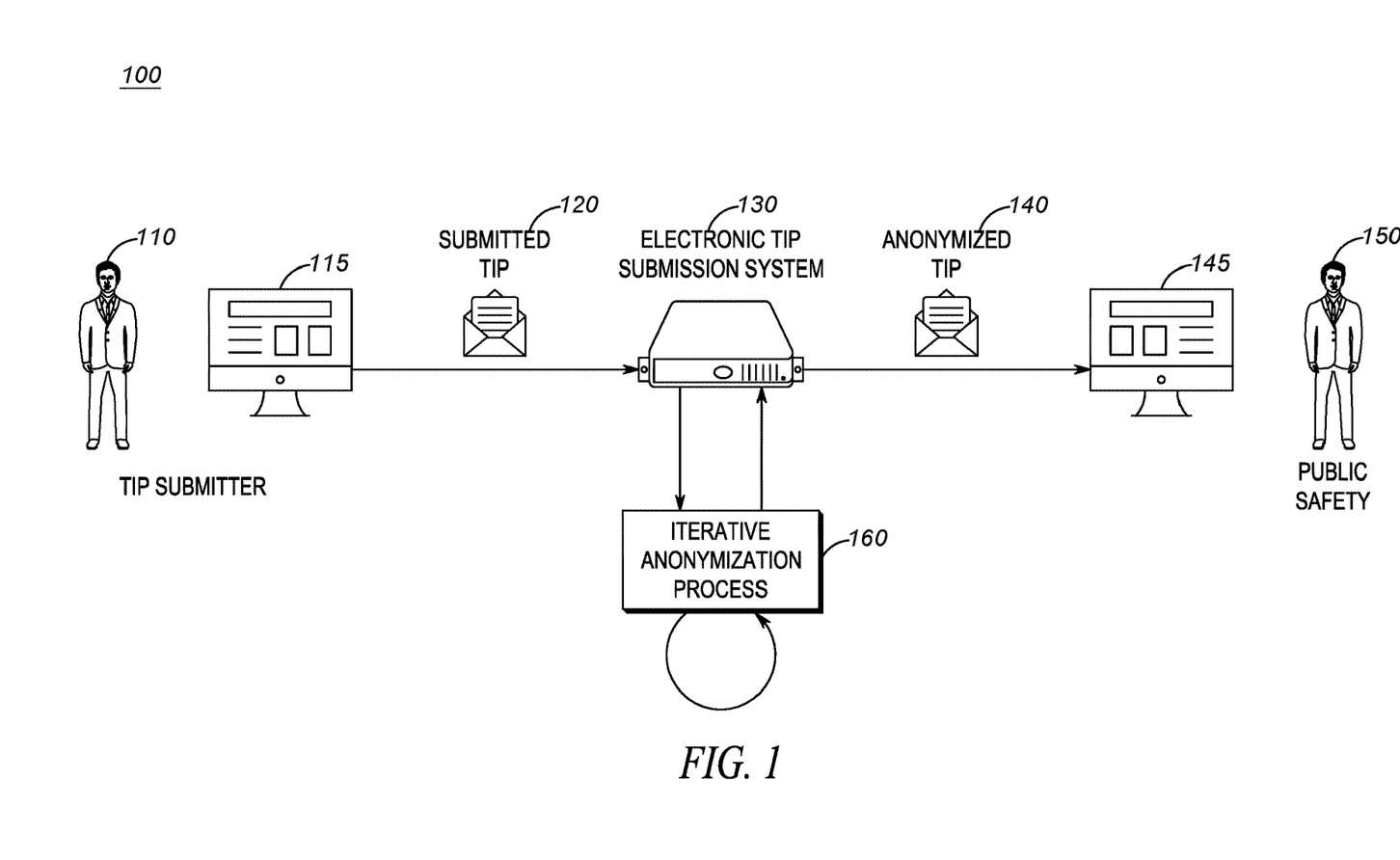
FIG. 1 is an example of a system which may implement the ensuring a submitter of an anonymous tip remains anonymous techniques described herein.

FIG. 1 is an example of a system which may implement the ensuring a submitter of an anonymous tip remains anonymous techniques described herein. System 100 may include a tip submitter electronic device 115, an electronic tip submission system 130, and a public safety tip reception device 145. Tip submitter electronic device may be any type of electronics equipment suitable for use in sending electronic messages. For example, tip submitter electronic device may include smartphones, personal computers, laptop computers, personal digital assistants, tablets, phablets, automated voice response systems, or any other such device. The techniques described herein may utilize any electronic device capable of sending a message to the electronic tip submission system 130.

The techniques described herein are not dependent on any particular form of electronic message. For example, messages may include filling in a form on a web page, sending a SMS text message, sending an e-mail, or any other type of message that that can allow a tip to be conveyed to the electronic tip submission system. The techniques described herein are not limited to any particular communications mechanism between the tip submitter electronic device 115 and the electronic tip submission system 130. For example, communications may be over networks such as the Internet, private intranets, the cellular telephone network, the SMS text message network, or any other network that allows tips to be sent from the tip submitter electronic device to the electronic tip submission system.

Electronic tip submission system 130 may be any system capable of receiving an electronic tip from a tip submitter, performing the iterative anonymization process described further below, and sending the anonymized tip to public safety personnel. For example, the electronic tip submission system may be a server computer connected to a network. As explained above, the techniques described herein may utilize any communications techniques that allow a tip to be sent from the tip submitter electronic device 115 to the electronic tip submission system 130. A more detailed example of electronic tip submission system 130 is described below with respect to FIG. 3.

Public safety tip reception device 145, just like tip submitter electronic device 115 may be any electronic device capable of receiving anonymized tips from electronic tip submission system 130. For example, public safety tip reception device may include smartphones, personal computers, laptop computers, personal digital assistants, tablets, phablets, automated voice response systems, or any other such device. The techniques described herein may utilize any electronic device capable of sending a message to the electronic tip submission system 130.

Public safety tip reception device 145 may communicate with electronic tip submission system 130 using any suitable communications mechanism. For example, communications may be over networks such as the Internet, private intranets, the cellular telephone network, the SMS text message network, or any other network that allows anonymized tips to be sent from the electronic tip submission system to the public safety tip reception device.

In operation, a tip submitter 110 may have a piece of information that he wishes to communicate anonymously to a public safety official. For example, the tip submitter may be a member of the public that wishes to anonymously report a crime to law enforcement. As another example, the tip submitter may be an individual that wishes to complain about some other quality of life issue (e.g. reporting excessive potholes in the street, etc.). Techniques described herein are not limited to tips related to any particular subject. What should be understood is that tip submitter 110 wishes to submit a tip in such a manner that the tip submitters identify cannot be determined.

Tip submitter 110 may submit their tip 120 to an electronic tip submission system 130 via the tip submitter's electronic device 115. For example, the tip may be submitted as an e-mail, by filling out a form on a web page, via SMS message, or through any other suitable technique. The electronic tip submission system may process the submitted tip 120 to ensure that the tip submitter remains anonymous. For example, the electronic tip submission system may perform an iterative anonymization process 160 on the submitted tip to ensure the tip submitter remains anonymous. The iterative anonymization process is described in further detail below.

Once the tip has been anonymized, electronic tip submission system 130 may send the anonymized tip 140 to the public safety tip reception device. As explained above, any electronic device capable of receiving the anonymized tip is suitable for use as the public safety tip reception device 145. Public safety personnel 150 may then receive the anonymized tip and act accordingly. What should be understood is that public safety personnel would not be able to determine the identity of tip submitter 110 from the anonymized tip.

Figure 2:
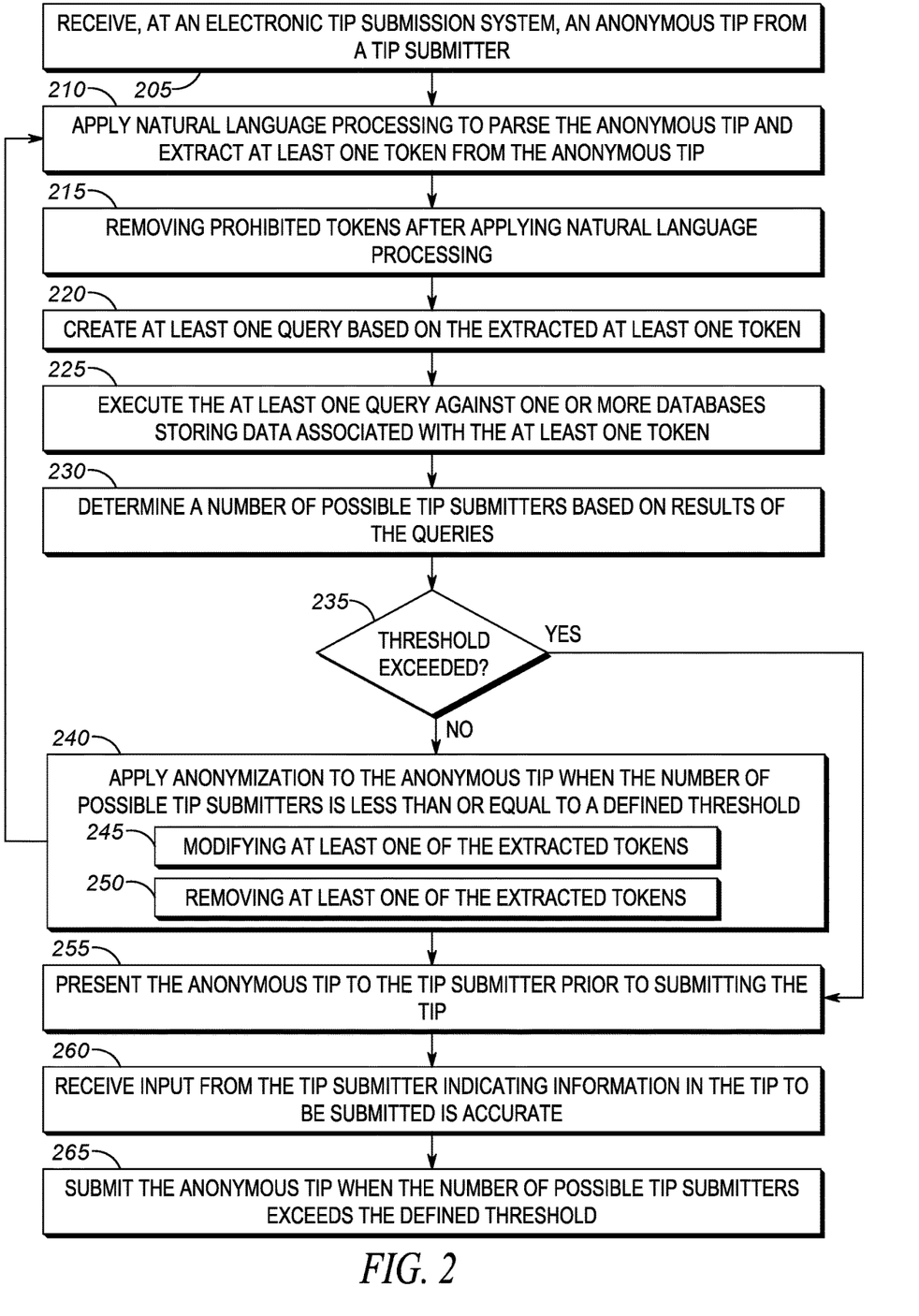
FIG. 2 is an example of a flow chart for implementing the ensuring a submitter of an anonymous tip remains anonymous techniques described herein.

FIG. 2 is an example of a flow chart for implementing the ensuring a submitter of an anonymous tip remains anonymous techniques described herein. In block 205, an anonymous tip may be received, from a tip submitter, at an electronic tip submission system. As explained above in the description of system 100, the electronic tip submission system 130 may receive tips from tip submitters in any number of forms (e.g. web page form, SMS message, e-mail). The particular form in which the message is received is not particularly relevant to the instant disclosure.

In block 210, natural language processing may be applied to parse the anonymous tip and extract at least one token from the anonymous tip. The ability to tokenize a text string though natural language processing is known. Existing algorithms allow for identification of places, dates, people's names, intent, relationships between people, and may other types of tokens. The techniques described herein may utilize any currently known or subsequently developed techniques to identify tokens within the anonymous tip. In block 215, prohibited tokens may be removed after applying the natural language processing. For example, all proper nouns (e.g. names of people) may be removed. In other words, certain tokens may always be considered as identifying the tip submitter and may simply be excluded prior to further processing.

In block 220, at least one query may be created based on the extracted at least one token. For example, as described above, extracted tokens may be "neighbor" and "11 Main Street." A query that may be created is, "How many neighbors exist for address 11 Main Street." In some implementations, answers to previous queries may form the basis for new queries. In the example tip presented above, the tipster claimed he could see the suspects garage from his front window. A query may be, "from what address can the garage of 11 Main Street be seen from the front window?" The answer may be "10 Main Street." A subsequent query that may be created is, "who lives at 10 Main Street?" The result of such a query could return a very small number of results, indicating the tip is not sufficiently anonymized.

In block 225, the queries may be executed against one or more databases storing data associated with the at least one token. For example, the query is "Who lives at address 10 Main Street?" may be executed against databases such as utility records or a police database. Queries related to vehicles (e.g. license plate numbers) may be executed against department of motor vehicles databases. In addition, general sources of information (e.g. Google searches) may also be used to execute queries. The techniques described herein are not dependent upon any specific databases to be queried. What should be understood is that any available data, regardless of where stored, may be utilized when executing queries.

In block 230, a number of possible tip submitters may be determined based on results of the queries. As explained above, if the number of results a query returns is below a threshold value, this may indicate that it would be too easy to identify the tip submitter, thus preventing the system from ensuring the tip submitter remains anonymous. For example, if the result of the query "How many neighbors of address 11 Main street?" produces 1000 results (e.g. dense urban environment) the tip may be sufficiently anonymized. However, if the result is only two possible neighbors, then that may not be sufficient anonymization.

It should further be understood that the number of possible tip submitters may be based on a combination of two or more queries. For example, a query may return that there are 500 people named John Smith in a given geographic area (e.g. in a city of 100s of thousands of people) which may be a sufficiently large number to ensure the anonymity of a tip submitter. The results of the query may indicate that there are 1000 neighbors to address 11 Main Street. However, when combined (e.g. of the 1000 neighbors to 11 Main Street, how many are named John Smith) may produce a much smaller number. What should be understood is that all the query results are analyzed individually and together to determine the total number of possible tip submitters.

In block 235 it may be determined if the threshold has been exceeded. In other words, it can be determined if the number of possible results is great enough that the tip can be considered anonymous. If not, the process may move to block 240. In block 240, anonymization techniques may be applied to the anonymous tip when the number of possible tip submitters is less than or equal to a defined threshold.

In block 245, at least one of the extracted tokens may be modified. For example, extracted proper nouns/names may be modified by replacing them with generic pronouns (e.g. "John Smith" may be replaced with "tipster" or "he"). Current natural language processing techniques provide numerous ways in which a natural language tip may be modified to replace specific tokens with more generic tokens.

In block 250, at least one of the extracted tokens may be removed. As explained above, certain tokens may indicate relationships (e.g. "neighbor") that would, by their nature, reduce the number of possible query results. These types of tokens may simply be removed. In addition, certain tokens, such as people's names, may also be removed. Once block 240 is complete, the process may return to block 210 and repeat. The process may iterate until the check in block 235 indicates the number of possible results exceeds the threshold.

Once the number of possible query results exceeds the threshold, the process may move to block 255. In block 255, the anonymous tip, as modified in the previous steps, may be presented to the tip submitter prior to submitting the tip. In some cases, the anonymization process described above may result in a tip that does not properly convey the original meaning of the submitted tip. For example, certain details, such as a proper noun (e.g. a name) may be important for a tip. For example, the original tip may have been, "I know that John Doe committed the crime." If the process above removed the name "John Doe" and replaced it with the generic pronoun "he" the tip (e.g. "I know that he committed the crime.") would no longer be very valuable. In block 255, the tip submitter may be given the opportunity to review (and modify) the tip that will be submitted.

In block 260, input may be received form the tip submitter indicating that the information in the tip to be submitted is accurate. Thus, the tip submitter may be given the opportunity to review and modify the tip to be submitted in block 255 and the ability to approve the submission in block 260. It should be understood that the review and approval block 255 and 260 are not required and some implementations of the techniques described herein may omit those steps. In block 265, the anonymous tip may be submitted when the number of possible tip submitters exceeds the defined threshold. As explained above, once the number of query results exceeds a threshold, the tip may be considered properly anonymized and can be submitted to public safety personnel.

Figure 3:
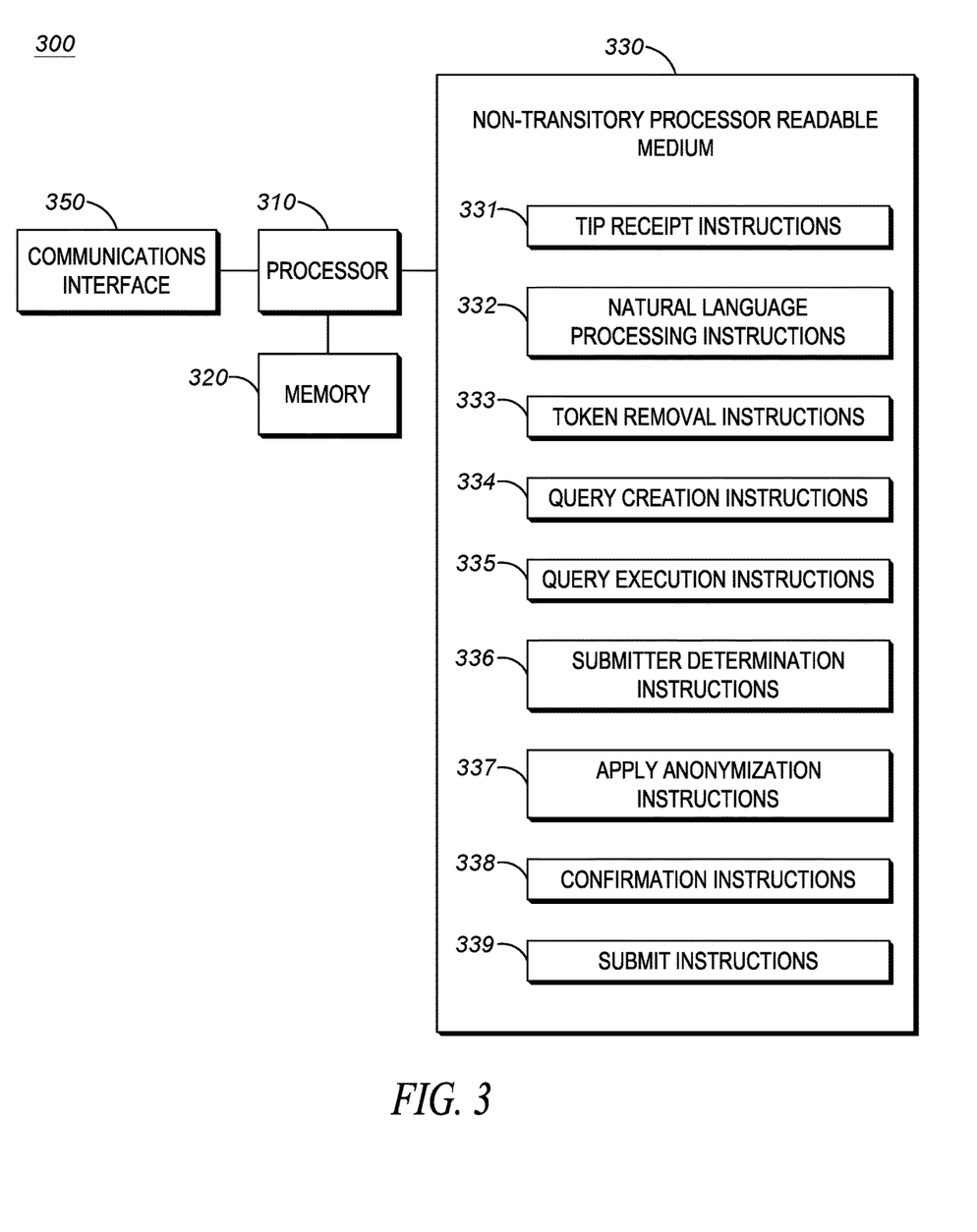
FIG. 3 is an example, of a device including a non-transitory processor readable medium that may implement the ensuring a submitter of an anonymous tip remains anonymous techniques described herein.

FIG. 3 is an example, of a device including a non-transitory processor readable medium that may implement the ensuring a submitter of an anonymous tip remains anonymous techniques described herein. The device 300 may include a processor 310 coupled to a memory 320. The memory 320 may contain a set of instructions thereon that when executed by the processor cause the processor to implement the techniques described herein.

The memory 320 may be loaded with instructions that are stored on non-transitory processor readable medium 330. The processor 310 may cause instructions from the medium 330 to be loaded into the memory 320 in order to be executed by the processor. In some implementations, the processor 310 may execute the instructions directly from medium 330.

The medium 330 may include instructions such as tip receipt instructions 331. Tip receipt instructions may allow the processor to receive a tip from a tip submitter. The tip receive instructions may generally be instructions to implement the process described with block 205. The medium 330 may also include natural language processing instructions 332. Natural language processing instructions may allow the processor to parse the incoming tip. The natural language processing instructions may generally be instructions to implement the process described with respect to block 210.

The medium 330 may also include token removal instructions 333. Token removal instructions may allow the processor to remove prohibited tokens create identified during natural language processing. The token removal instructions may generally be instructions to implement the process described with respect to block 215. The medium 330 may also include query creation instructions 334. Query creation instructions may allow the processor to create queries based on the tokens identified during natural language processing. The query creation instructions may generally be instructions to implement the process described with respect to block 220.

The medium 330 may also include query execution instructions 335. Query execution instructions may allow the processor to execute the previously created queries and receive the results. The query execution instructions may generally be instructions to implement the process described with respect to block 225. The medium 330 may also include submitter determination instructions 336. Submitter determination instructions may allow the processor to determine of many possible tip submitters may exist based on the number of query results. The submitter determination instructions may generally be instructions to implement the process described with respect to block 230.

The medium 330 may also include apply anonymization instructions 337. Apply anonymization instructions may allow the processor to further anonymize the submitted tip. The apply anonymization instructions may generally be instructions to implement the process described with respect to blocks 240-250. The medium 330 may also include confirmation instructions 338. Confirmation instructions may allow the processor to confirm the anonymized tip still conveys the correct information. The confirmation instructions may generally be instructions to implement the process described with respect to blocks 255-260. The medium 330 may also include submit instructions 339. Submit instructions may allow the tip to be submitted to a public safety official. Submit instructions may generally be instructions to implement the process described with respect to block 265.

Processor 310 may also be coupled with communications interface 350. The communications interface may be any interface that permits communication with tip submitter electronic device 115 and public safety tip reception device 145. For example, the communications interface may be a wired or wireless network interface, a cellular telephone network interface, a Bluetooth interface, or any other type of interface that permits communications between device 300 and tip submitters/receivers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   a) receiving, at an electronic tip submission system, an anonymous tip from a tip submitter;
   b) applying natural language processing to parse the anonymous tip and extract at least one token from the anonymous tip;
   c) creating at least one query based on the extracted at least one token;
   d) executing the at least one query against one or more databases storing data associated with the at least one token;
   e) determining a number of possible tip submitters based on results of the at least one query;
   f) applying anonymization to the anonymous tip when the number of possible tip submitters is less than or equal to a defined threshold;
   g) submitting the anonymous tip from the tip submitter when the number of possible tip submitters exceeds the defined threshold; and
   repeating steps b-g until the number of possible tip submitters exceeds the defined threshold.

2. The method of claim 1 wherein applying anonymization to the anonymous tip further comprises:
   modifying at least one of the extracted tokens.

3. The method of claim 1 wherein applying anonymization to the anonymous tip further comprises:
   removing at least one of the extracted tokens.

4. The method of claim 1 further comprising:
   removing prohibited tokens after applying natural language processing.

5. The method of claim 1 further comprising:
   presenting the anonymous tip to the tip submitter prior to submitting the tip; and
   receiving input from the tip submitter indicating information in the tip to be submitted is accurate.

6. The method of claim 1 wherein the created at least one query is based on a query result of a previous query.

7. A system comprising:
   a processor; and
   a memory coupled to the processor, the memory containing a set of instructions thereon that when executed by the processor cause the processor to:
   a) receive, at an electronic tip submission system, an anonymous tip from a tip submitter;
   b) apply natural language processing to parse the anonymous tip and extract at least one token from the anonymous tip;
   c) create at least one query based on the extracted at least one token;
   d) execute the at least one query against one or more databases storing data associated with the at least one token;
   e) determine a number of possible tip submitters based on results of the at least one query;
   f) apply anonymization to the anonymous tip when the number of possible tip submitters is less than or equal to a defined threshold;
   g) submit the anonymous tip from the tip submitter when the number of possible tip submitters exceeds the defined threshold; and
   repeat steps b-g until the number of possible tip submitters exceeds the defined threshold.

8. The system of claim 7 wherein the instructions to apply anonymization to the anonymous tip further comprises instructions to:
   modify at least one of the extracted tokens.

9. The system of claim 7 wherein the instructions to apply anonymization to the anonymous tip further comprises instructions to:
   remove at least one of the extracted tokens.

10. The system of claim 7 further comprising:
    removing prohibited tokens after applying natural language processing.

11. The system of claim 7 further comprising instructions to:
    present the anonymous tip to the tip submitter prior to submitting the tip; and receive input from the tip submitter indicating information in the tip to be submitted is accurate.

12. The system of claim 7 wherein the created at least one query is based on a query result of a previous query.

13. A non-transitory processor readable medium containing a set of instructions thereon that when executed by a processor cause the processor to:
   a) receive, at an electronic tip submission system, an anonymous tip from a tip submitter;
   b) apply natural language processing to parse the anonymous tip and extract at least one token from the anonymous tip;
   c) create at least one query based on the extracted at least one token;
   d) execute the at least one query against one or more databases storing data associated with the at least one token;
   e) determine a number of possible tip submitters based on results of the at least one query;
   f) apply anonymization to the anonymous tip when the number of possible tip submitters is less than or equal to a defined threshold;
   g) submit the anonymous tip from the tip submitter when the number of possible tip submitters exceeds the defined threshold; and
   repeat steps b-g until the number of possible tip submitters exceeds the defined threshold.

14. The medium of claim 13 wherein instructions to apply anonymization to the anonymous tip further comprises instructions to:
   modify at least one of the extracted tokens.

15. The medium of claim 13 wherein instructions to apply anonymization to the anonymous tip further comprises instructions to:
   remove at least one of the extracted tokens.

16. The medium of claim 13 further comprising instructions to:
   present the anonymous tip to the tip submitter prior to submitting the tip; and
   receive input from the tip submitter indicating information in the tip to be submitted is accurate.

17. The medium of claim 13 wherein the created at least one query is based on a query result of a previous query.

\* \* \* \* \*